United States Patent [19]
Gill et al.

[11] Patent Number: 5,515,221
[45] Date of Patent: May 7, 1996

[54] MAGNETICALLY STABLE SHIELDS FOR MR HEAD

[75] Inventors: Hardayal S. Gill, Portola Valley; Tsann Lin, Saratoga, both of Calif.

[73] Assignee: International Business Machines Corporation, Armonk, N.Y.

[21] Appl. No.: 366,940

[22] Filed: Dec. 30, 1994

[51] Int. Cl.[6] .................................................. G11B 5/127
[52] U.S. Cl. .......................................... 360/113; 360/126
[58] Field of Search ..................................... 360/113, 126

[56] References Cited

U.S. PATENT DOCUMENTS

| | | | |
|---|---|---|---|
| 4,683,012 | 7/1987 | Yamauchi et al. | 48/301 |
| 4,836,865 | 6/1989 | Sakakima et al. | 148/306 |
| 4,843,506 | 6/1989 | Gill et al. | 360/113 |
| 5,067,991 | 11/1991 | Sawa et al. | 148/305 |
| 5,073,214 | 12/1991 | Hirota et al. | 148/306 |
| 5,168,409 | 12/1992 | Koyama et al. | 360/113 |
| 5,178,689 | 1/1993 | Okamura et al. | 148/306 |
| 5,207,841 | 5/1993 | Shigeta et al. | 148/307 |
| 5,208,715 | 5/1993 | Mowry | 360/126 X |
| 5,218,497 | 6/1993 | Tanabe et al. | 360/113 |
| 5,264,981 | 11/1993 | Campbell et al. | 360/126 |
| 5,287,237 | 2/1994 | Kitada et al. | 360/113 |
| 5,436,777 | 7/1995 | Soeya et al. | 360/113 |

FOREIGN PATENT DOCUMENTS 1-149941  6/1989  Japan.

*Primary Examiner*—John H. Wolff
*Attorney, Agent, or Firm*—Baker, Maxham, Jester & Meador

[57] ABSTRACT

First and second shield layers of a read head are constructed of a lamination of NiMn and Fe-based layers to improve the performance of the shield layers when they are subjected to high external fields, such as from the pole tips of a write head combined therewith. Without lamination with one or more NiMn layers, many shield materials do not return to the same domain configuration after excitation from an external field. The result is that the Fe-based material assumes a different domain configuration after each excitation which changes the bias point of the MR sensor of the read head. By laminating with NiMn, the uniaxial anisotropy of the material can be increased to provide uniform domain configuration and exchange pinning between shield material NiMn returns the material to the same configuration after each external field excitation. The invention further provides fine tunings of the magnetic properties of the shield layer by various combinations of the Fe-based layers and/or the NiMn layer with NiFe layers.

31 Claims, 14 Drawing Sheets

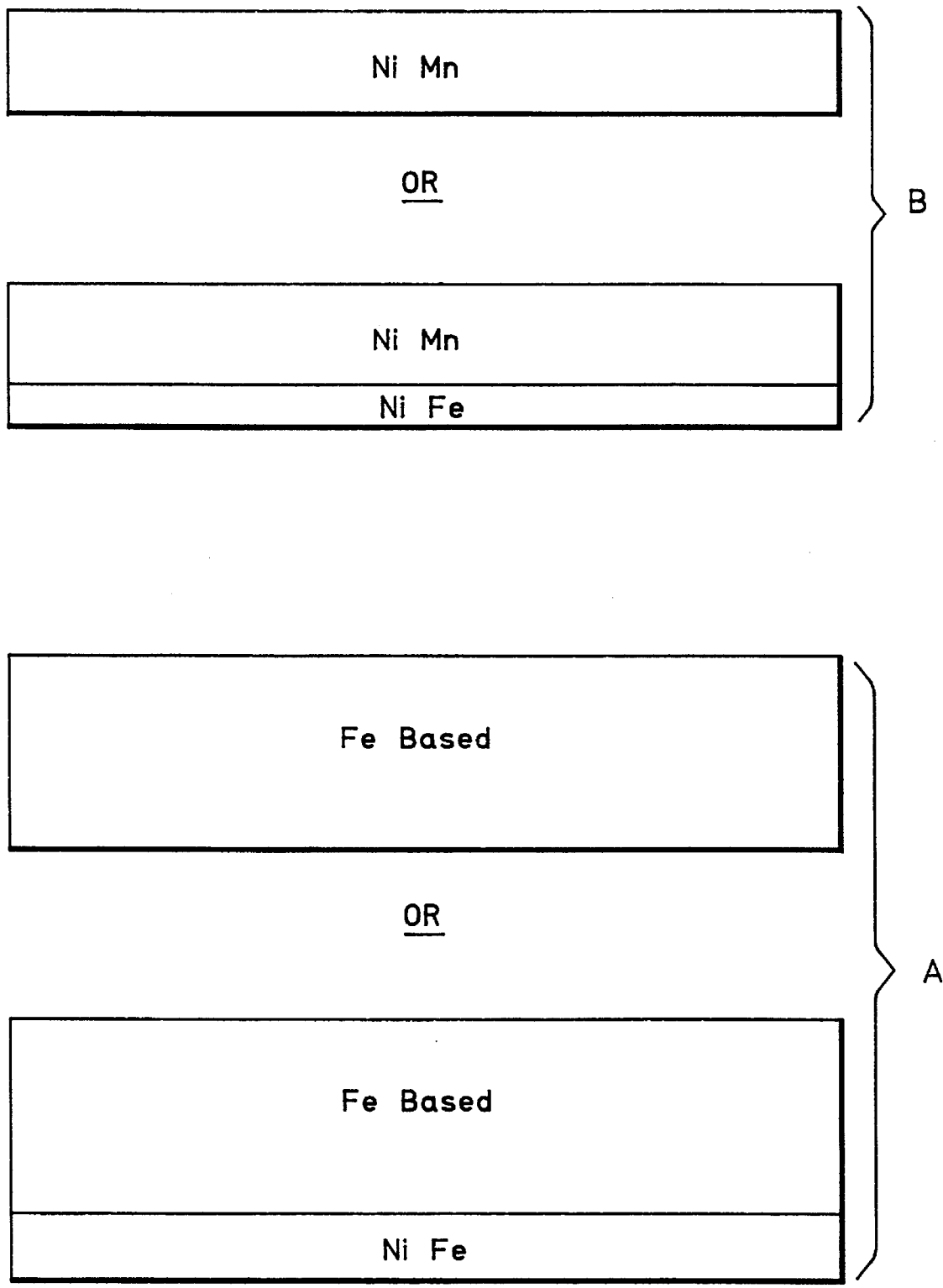
FIG. 11 (Codes A and B)

MAGNETICALLY STABLE SHIELDS FOR MR HEAD

BACKGROUND OF THE INVENTION

1. Field of the Invention

The present invention relates to a novel lamination of materials which provides a magnetically stable shield for an MR head and more particularly to a shield which returns to a common state so that after perturbation by a magnetic field, magnetostatic coupling between the shield and an MR sensor remains stable.

2. Description of the Related Art

An MR head includes an MR sensor which is sandwiched between first and second gap layers which are, in turn, sandwiched between first and second shield layers. In a disk drive the MR head is mounted on a slider which is connected to a suspension arm, the suspension arm urging the slider toward a magnetic storage disk. When the disk is rotated the slider flies above the surface of the disk on a cushion of air which is generated by the rotating disk. The MR head then plays back recorded magnetic signals (bits) which are arranged in circular tracks on the disk. In high density disk drives bits are closely spaced linearly about each circular track. In order for the MR head to playback the closely spaced bits the MR head has to have high resolution. This is accomplished by close spacing between the first and second shield layers, caused by thin first and second gap layers, so that the MR sensor is magnetically shielded from upstream and downstream bits with respect to the bit being read.

The MR sensor is a small stripe of conductive ferromagnetic material, such as Permalloy (NiFe), which changes resistance in response to a magnetic field such as magnetic flux incursions (bits) from a magnetic storage disk. The MR sensor receives a sense current and is connected to signal processing circuitry. When the sense current is transmitted through the MR sensor the processing circuitry detects changes in potential which are caused by changes in resistance of the MR sensor. The potential changes correspond to signals received by the MR sensor. The response curve (input vs. output) of an MR sensor has linear and non-linear portions. It is important that the MR sensor respond along its linear portion so that the MR sensor has a linear response. This is accomplished by magnetically biasing the MR sensor at a biasing point on the response curve which is in the linear response portion of the response curve.

An MR head is typically combined with an inductive write head to form a piggyback MR head or a merged MR head. In either head the write head includes first and second pole pieces which have a gap at a head surface and are magnetically connected at a back gap. The difference between a piggyback MR head and a merged MR head is that the merged MR head employs the second shield layer of the read head as the first pole piece of the write head. A conductive coil induces magnetic flux into the pole pieces, the flux fringing across the gap and recording signals on a rotating disk. The write signals written by the write head are large magnetic fields compared to the read signals shielded by the first and second shield layers. Thus, during the write operation a large magnetic field is applied to one or more of the shield layers causing a dramatic rotation of the magnetic moment of the shield layer.

Unfortunately, prior art shield layers are not stable when subjected to a large field. Sendust (FeSiAl), which is a typical shield material, is almost isotropic with an intrinsic uniaxial magnetic anisotropy of only about 1 Oe. This means that magnetic domains within the Sendust material are not well configured with respect to the MR sensor. The walls of the domains are random and when the shield is subjected to a large applied field, such as the write head field, the domains walls move and then return to a different random arrangement. Accordingly, there is a change in the stray magnetic field produced by the shield layer. Because of a magnetostatic coupling between the MR sensor and the shield layers the change in the stray magnetic field of the shield changes the bias point of the MR sensor which, in turn, changes the response of the MR sensor to signals from the rotating disk. The result is noise during the read operation. To make matters worse Sendust typically exhibits stress induced anisotropy due to its magnetostriction. This stress, which may be tensile or compressive, is developed by thin film construction and/or by lapping of an air bearing surface (ABS) at the flying surface of the head. Since the stress induced anisotropy can easily exceed the intrinsic anisotropy the stress induced anisotropy will control domain configuration. It could re-orient the domain structure in undesired direction depending on the magnitude of stress and magnetostriction.

In order for domain walls to be well configured they should be parallel to the easy axis of the MR sensor except for a small area of closure domains which are at each end of the shield layer. Further, the domain walls should always return to the same wall configuration after perturbation by a large applied field so that the magnetostatic coupling between the shield and the MR sensor remains a constant. This can be accomplished if the Sendust material is provided with sufficient intrinsic uniaxial anisotropy. Another material which has been considered for shields is iron nitride (FEN).

SUMMARY OF THE INVENTION

A multilayer magnetic structure of Fe-based (FEN, FeSiAl), NiFe and NiMn is described for magnetoresistive head shield application. In this multilayer structure, the use of an antiferromagnetic material, such as NiMn, provides an exchange-coupled field for the magnetically soft Fe-based material. The exchange-coupling field pins, i.e., fixes, the magnetic domain structure of the Fe-based material and, therefore, provides a magnetically stable shield material. The pinning action of the exchange field comes from its unidirectional attribute which makes the effective anisotropy of the shield essentially infinite as the magnetization tries to rotate away from the easy axis in response to an applied field perpendicular to the easy axis. For small rotations of the shield magnetization, which is the case for disk magnetic transition detection, the exchange field simply adds to the uniaxial anisotropy. However, for large external fields (e.g., the magnetic field from the write head), as the shield magnetization rotates to larger angles with the easy axis, the effective anisotropy increases and prevents saturation of the shield. Therefore, the original domain structure is kept intact.

The multilayer Fe-based/NiFe/NiMn structure also provides desired properties of uniaxial anisotropy from 5 to 15 Oe, permeability greater than 1000, coercivity along the easy axis less than 3 Oe and an exchange field between 3 and 10 Oe so that the exchange field is greater than coercivity.

The uniaxial anisotropy orientation provides a desirable configuration of magnetic domains; i.e., by setting the easy axis of magnetization parallel to the air bearing surface, domains with magnetization parallel to the easy axis are provided over the large central portion of the shield. The exchange field pins the domain structure against the large external field. That is, it prevents the reconfiguration of magnetic domains in response to large external fields, e.g., the field produced by the write head.

It is further shown that use of a NiFe buffer layer between an Fe-based soft magnetic film and an antiferromagnetic NiMn film provides an exchange-coupled field value which various inversely with the magnetization times thickness value, i.e., the magnetic moment M, for the soft magnetic film. The exchange field thus can be controlled to the desired value.

An object of the present invention is to provide an MR read head which operates about a constant bias point even though the shields for the MR sensor are subjected to large magnetic fields.

Another object is to provide a shield for an MR head which substantially returns to a constant domain structure after being subjected to a large magnetic field.

A further object is to provide a combined MR read head and inductive write head wherein magneto static coupling between shield layers and an MR sensor remains substantially constant after the shield layers are subjected to a large magnetic field from the write head.

Still another object is to provide a shield for an MR head which has soft magnetic properties and an intrinsic exchange field which is larger than the coercivity along an easy axis of the shield.

Still a further object is to provide a shield of an MR head with magnetic properties which optimize magnetic stability of the shield so that magneto static coupling between the shield and an MR stripe is substantially constant.

Still another object is to provide a laminated Fe-based/NiMn structure which can be employed for magnetic head components such as shields and/or write poles.

These and other objects and advantages of the invention will become more apparent to one skilled in the art upon reading the description of the invention in light of the accompanying drawings.

BRIEF DESCRIPTION OF THE DRAWINGS

FIG. 11 shows combinations of layers which are coded A and B, which code is to be employed for illustrating various combinations of laminated shield layers illustrated in FIGS. 12A, 12B and 12C.

DESCRIPTION OF THE PREFERRED EMBODIMENT

Figure 1:
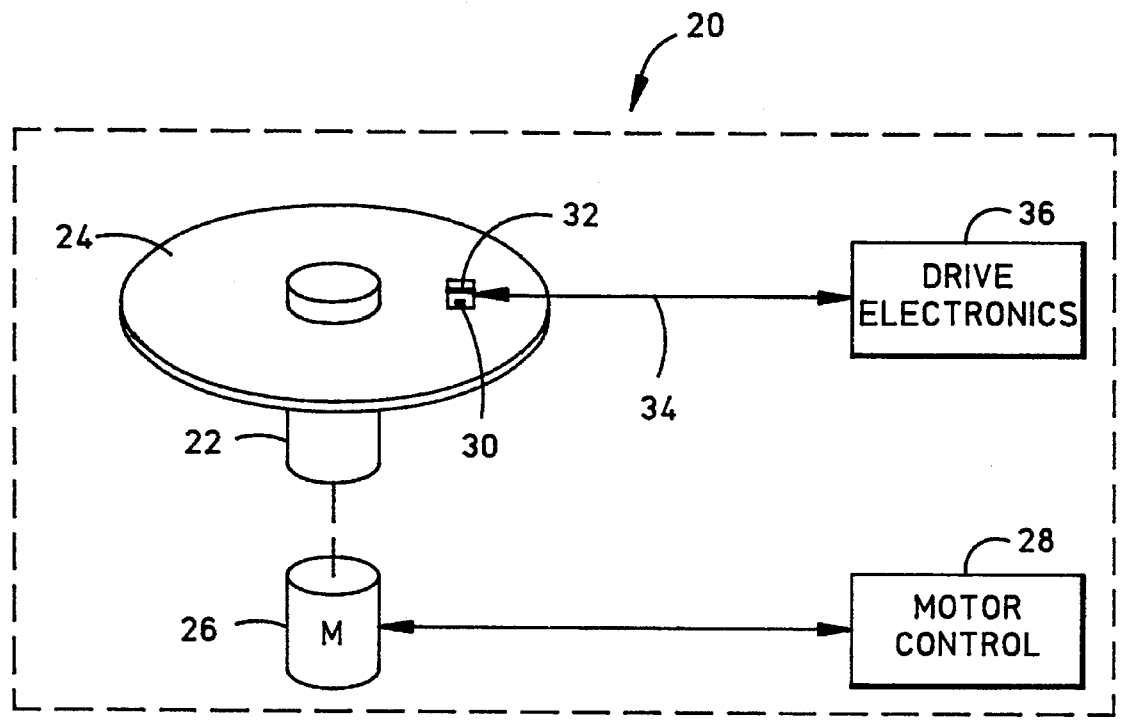
FIG. 1 is a schematic illustration of a magnetic disk drive which employs an MR read head of the present invention.

Referring now to the drawings wherein like reference numerals designate like or similar parts throughout the several views, there is illustrated in FIG. 1 a magnetic disk drive 20. The drive 20 includes a spindle 22 which supports and rotates a magnetic disk 24. The spindle 22 is rotated by a motor 26 which is controlled by drive controls 28. A magnetic head 30, which may be a merged MR head for recording and reading, is mounted on a slider 32 which in turn is supported by a suspension and actuator arm 34. The suspension and actuator arm 34 positions the slider 32 so that the magnetic head 30 is in a transducing relationship with a surface of the magnetic disk 24. When the disk 24 is rotated by the motor 26, air is moved by the surface of the disk, causing the slider to ride on a cushion of air (an air bearing) slightly above the surface, in the order of 0.075 microns. The magnetic head 30 is then employed for writing information to multiple circular tracks on the surface of the disk 24 as well as reading information therefrom. These information signals as well as servo signals for moving the slider to various tracks are processed by drive electronics 36.

Figure 2:
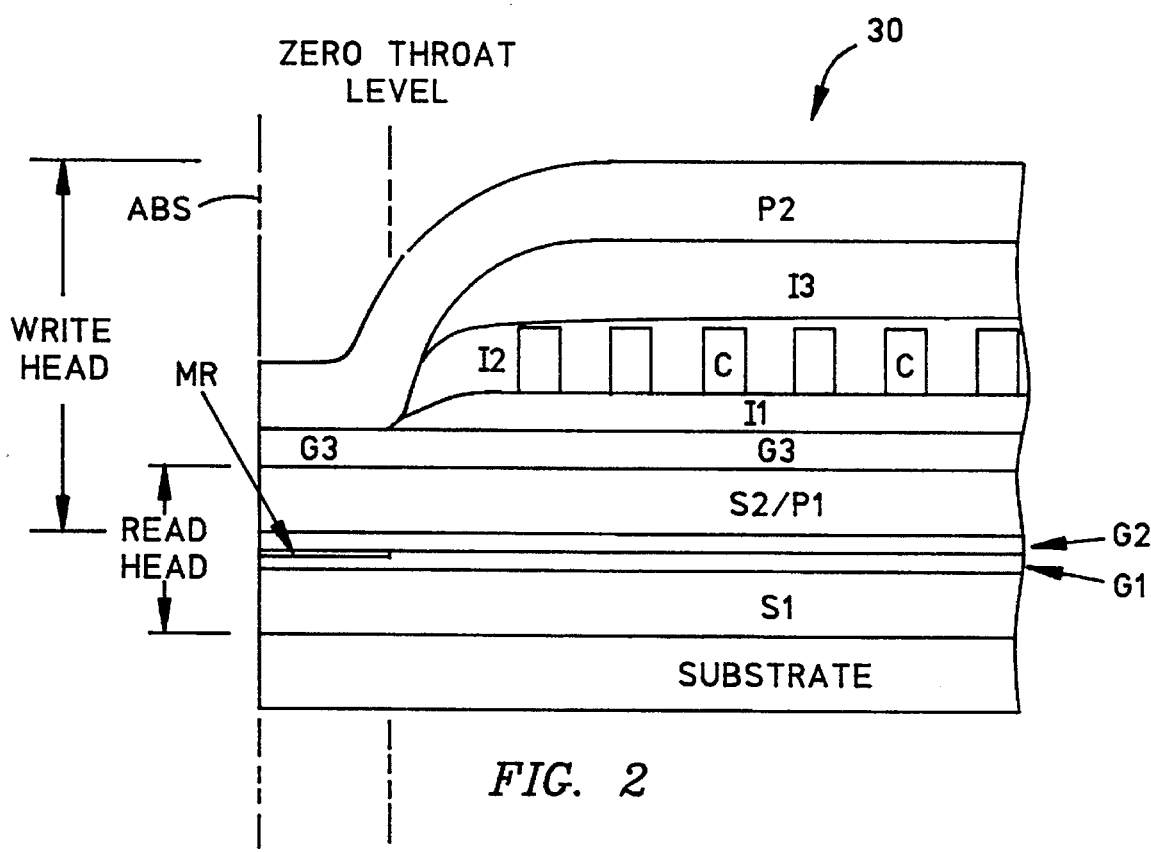
FIG. 2 is a vertical cross section of a merged MR head which employs shield layers S1 and S2 constructed according to the present invention.

FIG. 2 is a side cross-sectional schematic illustration of the merged MR head 30 which includes a read head portion and a write head portion which are lapped to an air bearing surface (ABS), the air bearing surface being spaced from the surface of the rotating disk by the air bearing as discussed hereinabove. The read head portion includes an MR sensor which is sandwiched between first and second gaps layers G1 and G2 which, in turn, are sandwiched between first and second shield layers S1 and S2. The write head portion includes a coil layer C and insulation layer I2 which are sandwiched between insulation layers I1 and I3 which in turn are sandwiched between first and second pole pieces P1 and P2. A gap layer G3 is sandwiched between the first and second pole pieces at their pole tips adjacent the ABS for providing a magnetic gap. When signal current is conducted through the coil layer C, signal flux is induced into the first and second pole layers P1 and P2 causing signal fringe flux across the pole tips of the pole pieces at the ABS. This Signal fringe flux is induced into circular tracks on the rotating disk 24, shown in FIG. 1, during a write operation. During a read operation, recorded magnetic flux signals on the rotating disk are induced into the MR sensor of the read head causing a change in the resistance of the MR sensor which can be sensed by a change in potential across the MR sensor responsive to a sense current (not shown) conducted through the MR sensor. These changes in potential are processed by the drive electronics 36 shown in FIG. 1. The combined head illustrated in FIG. 2 is a merged MR head in which the second shield layer S2 is employed as a first pole piece P1 for the combined head. In a piggyback head (not shown) the second shield layer S2 and the first pole piece P1 are separate layers.

Figure 3:
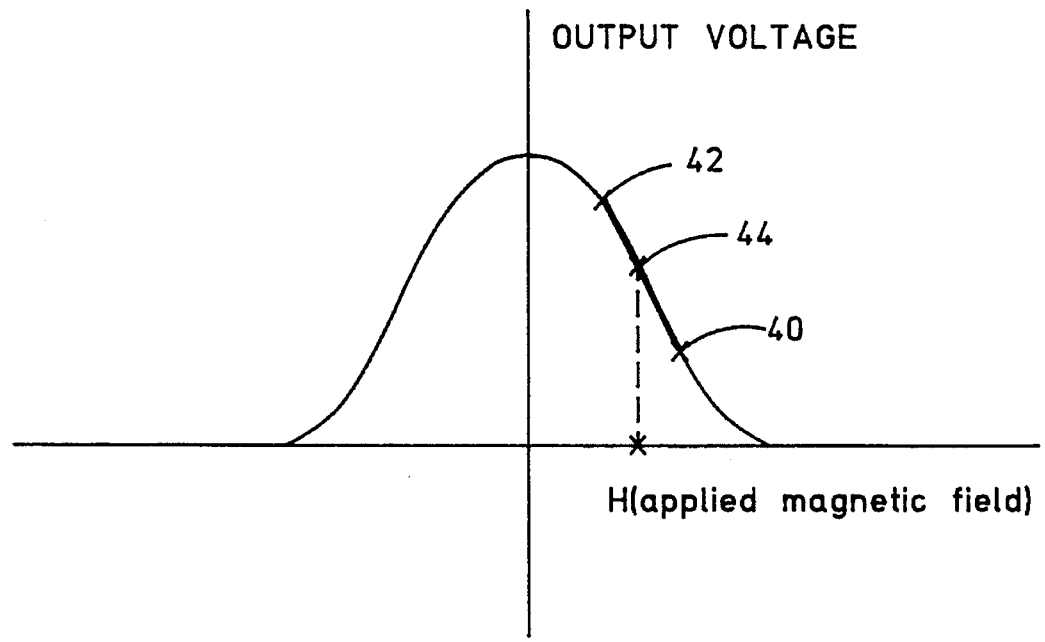
FIG. 3 is a typical response curve for an MR sensor of an MR head.

A typical response curve for the MR sensor, shown in FIG. 2, is illustrated in FIG. 3. It can be seen that the MR sensor has a generally linear response between points 40 and 42 on the response curve for a positive applied magnetic field H. The MR sensor is biased at a point 44 selected between the extremes 40 and 42 to provide a linear response to an applied magnetic field, such as the magnetic data signals recorded on the disk 24. This may be accomplished, as is well-known in the art, by an adjacent conductor which provides a bias field magnetostatically coupled to the MR sensor. Since the shield layers S1 and S2, shown in FIG. 2, are magnetic layers, they are also magnetostatically coupled to the MR sensor. If the magnetic properties of these shield layers S1 and S2 do not remain constant during operation of the read head, this will affect the magnetization of the MR head and, consequently, the position of the bias point 44 shown in FIG. 3. This condition would seriously degrade the performance of the read head.

Figure 4A:
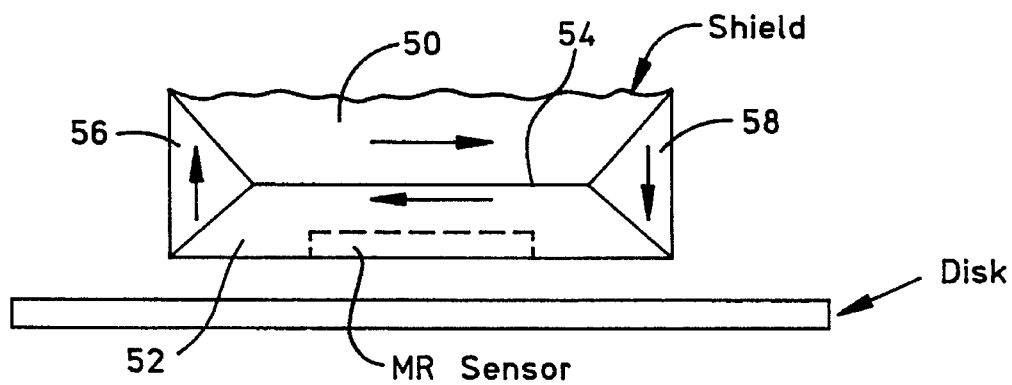
FIGS. 4A and 4B are schematic illustrations of two different domain configurations of a shield layer with respect to an MR sensor.
Figure 4B:
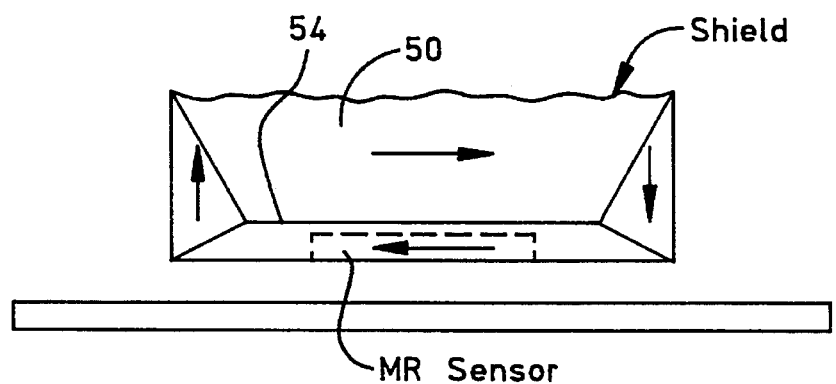

FIGS. 4A and 4B illustrate how the magnetic properties of the shield layer can affect the operation of the MR sensor. FIG. 4A illustrates a desired magnetic domain configuration for a shield layer with respect to the MR sensor. The primary domains 50 and 52 are elongated and parallel to the ABS and the easy axis of the MR sensor, the domains being separated by a domain wall 54. The magnetic spins within the domains are magnetically oriented in opposite directions resulting in a domain wall 54. Smaller closure domains 56 and 58 are located at opposite ends of the shield layer. The uniform configuration of the domains illustrated in FIG. 4A is caused by uniaxial anisotropy of the shield layer. If the shield layer was isotropic or nearly isotropic, such as Sendust, the domains would have a random configuration as contrasted to the uniform configuration shown in FIG. 4A.

During a write operation of the write head shown in FIG. 2, a strong magnetic field is produced across the pole tips of the pole pieces P1 and P2 at the gap G3. This magnetic field, which is directed perpendicular to the domains 50 and 52 and the easy axis of the MR sensor of FIG. 4A dramatically reconfigures the domain structure within the shield layers. During the write operation, the shield layers will be driven to saturation along their hard axis, which is perpendicular to the ABS, causing each of the shield layers to go to a single domain state with all of the spins within the single domain aligned along the direction of the field. During the write head operation, the read head is not operating so that these magnetic conditions of the shield layers have no affect upon the read head. It is what happens immediately after the write head operation that is important to the read head operation. If each of the shield layers returns to its original magnetic condition when the write head shuts off, as shown in FIG. 4A, there is no change in the magneto static coupling between the shield layers and the MR sensor. Unfortunately, this desirable condition has not been occurring with prior art shield layers for MR read heads.

Because of undesirable magnetic properties of prior art shield layers in MR heads, the domain configuration can return to a metastable state, as shown in FIG. 4B, after the write head switches to an off condition. This can place the domain wall 54 close to or directly over the MR sensor which causes a change in the magnetostatic coupling between the shield and the MR sensor. This then changes the bias point 44, as shown in FIG. 3, resulting in nonlinear or erroneous signal response by the MR sensor. Because of imperfections in the shield layer, the domain wall 54 can actually move after the write head switches to an off condition resulting in what is known as Barkhausen noise. The condition shown in FIG. 4B is the result of insufficient uniaxial anisotropy of the shield layer allowing the domain structure to shift to a metastable state when the write head shuts off. The present invention provides sufficient uniaxial anisotropy and unidirectional anisotropy fields for Fe-based materials to return the shield layer to its original domain configuration after excitation by a large magnetic field, such as from a write head during its operation.

Figure 5A:
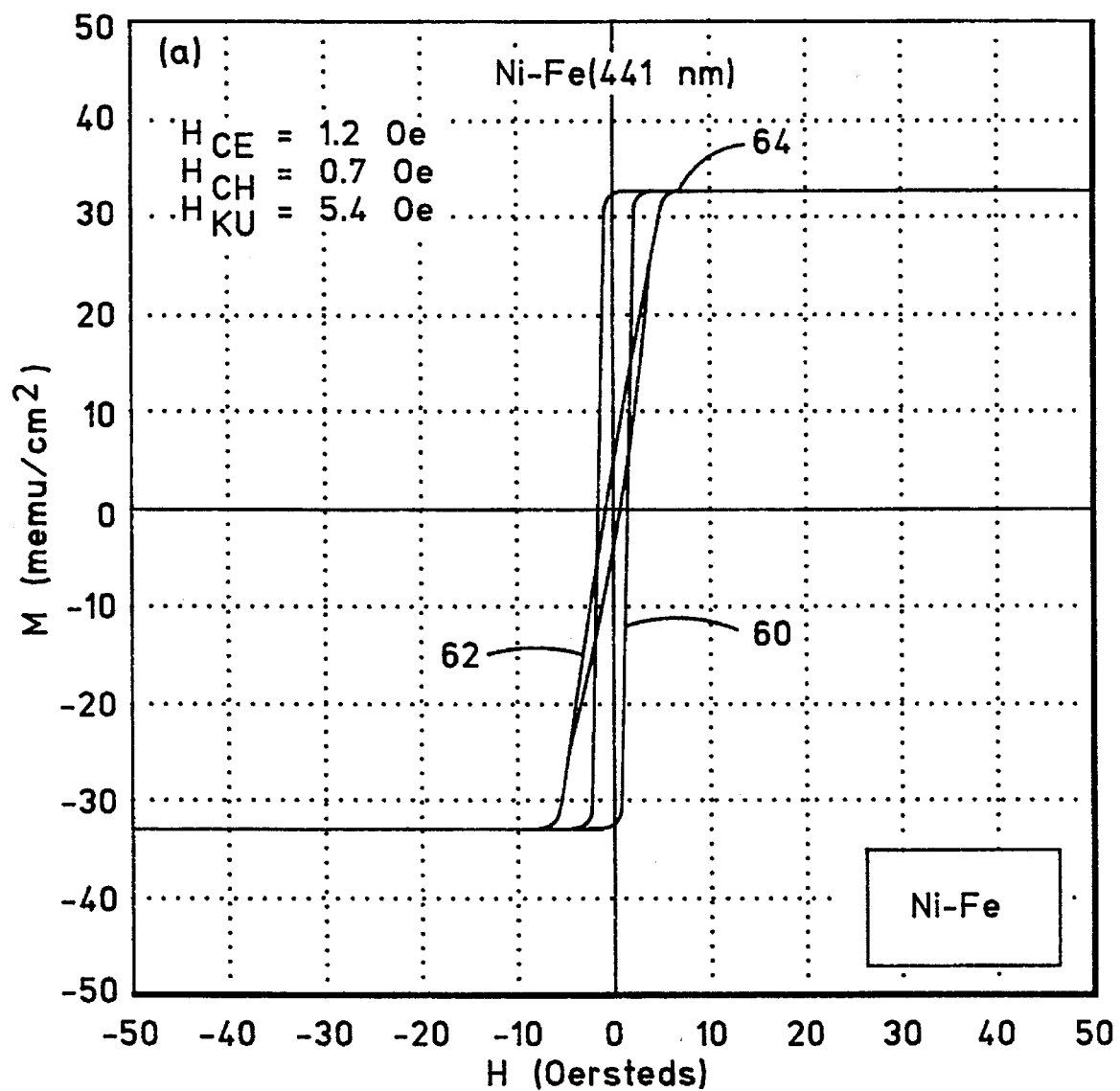
FIG. 5A is a cross-sectional view of a NiFe film and corresponding hysteresis loops along the easy axis and the hard axis.

FIG. 5A is a graph of hysteresis loops 60 and 62 along the easy axis and hard axis, respectively, of a typical prior art NiFe shield layer ($M_s$=780 emu/cm$^3$). The applied field H is shown along the abscissa and the magnetic moment ($M=M_s t$ where t is the thickness of the NiFe shield layer) of the material is shown along the ordinate. The magnetic uniaxial anisotropy field $H_{KU}$ of the material is the amount of applied field H along the hard axis of the material to obtain magnetic saturation as shown at 64. When there is an $H_{KU}$ of 5.4 Oe, the domain structure will be as shown in FIG. 4A when the applied field H is less than 5.4 Oe. This means that the domains will be uniform and the magnetic moments of the domains will be parallel to the easy axis of the shield material when the applied field is zero. When the applied field H exceeds $H_{KU}$ saturating the material as shown at 64, the material goes to a single domain state with all the spins oriented in the direction of the field. The coercivity $H_{CE}$ of the material is determined by an applied field H along the easy axis. Coercivity along the easy axis is the amount of applied field H required to commence domain wall motion.

Figure 5B:
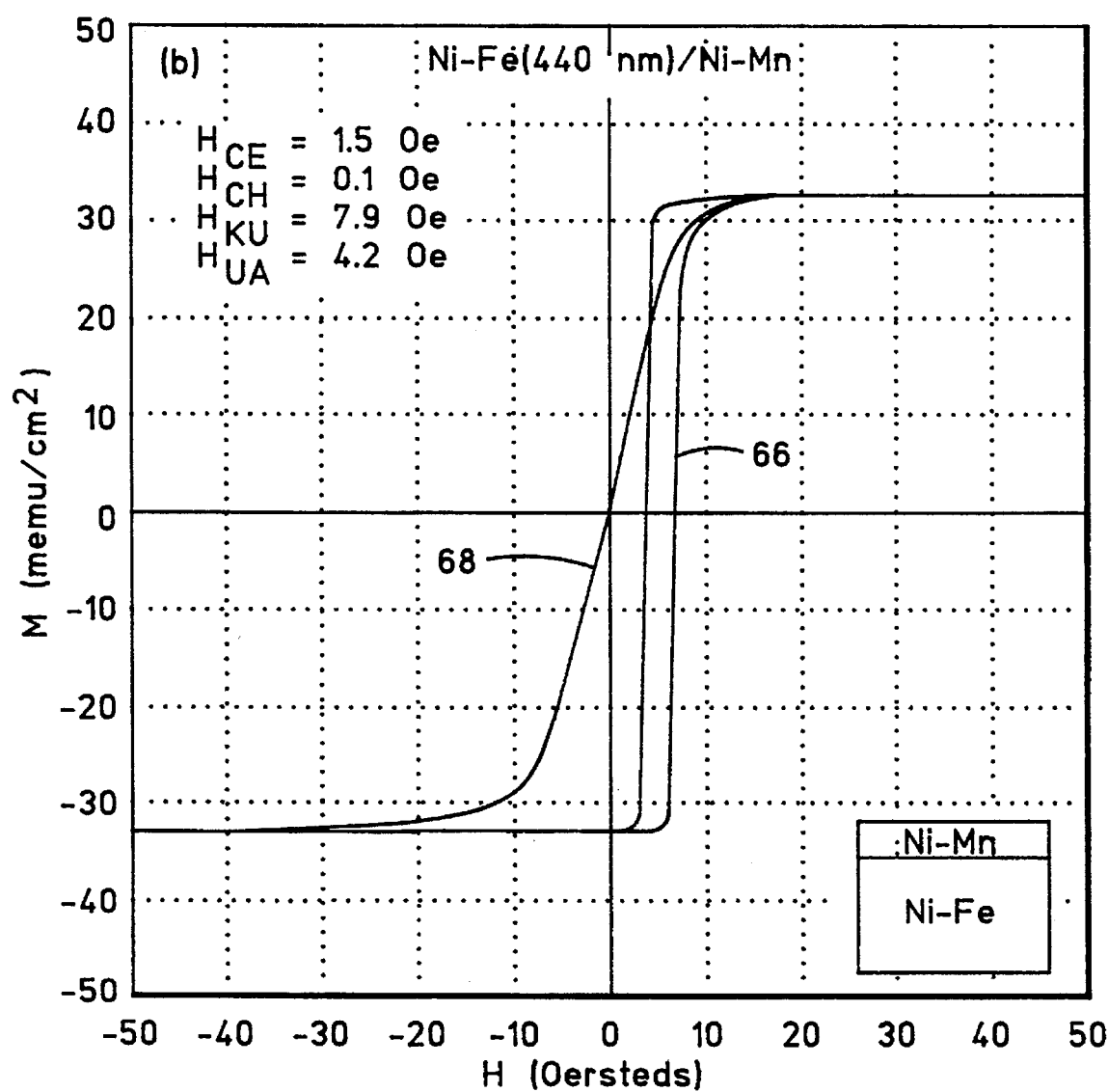
FIG. 5B is a cross-sectional view of exchange-coupled NiFe/NiMn films and corresponding hysteresis loops along the easy axis and the hard axis.
Figure 6A:
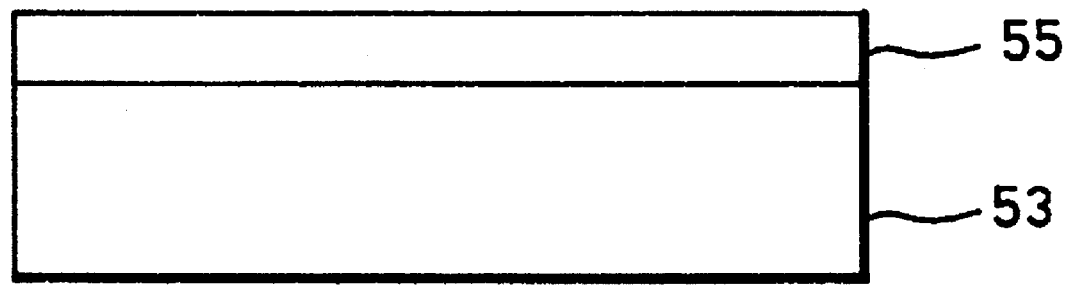
FIG. 6A is a cross-sectional view of a first preferred embodiment of the present invention.
Figure 6B:
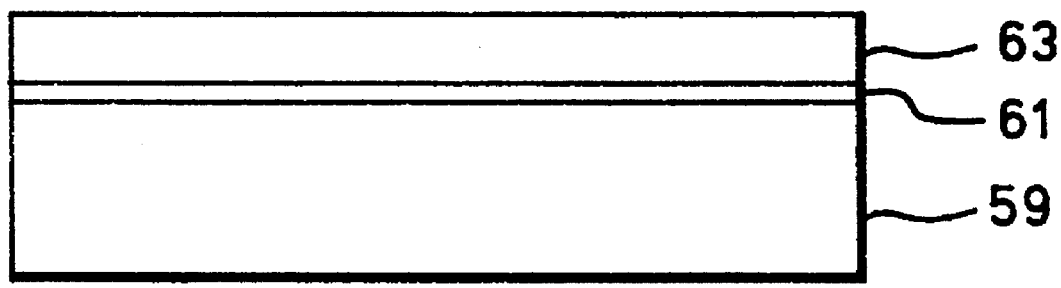
FIG. 6B is a cross-sectional view of a second preferred embodiment of the present invention.
Figure 10:
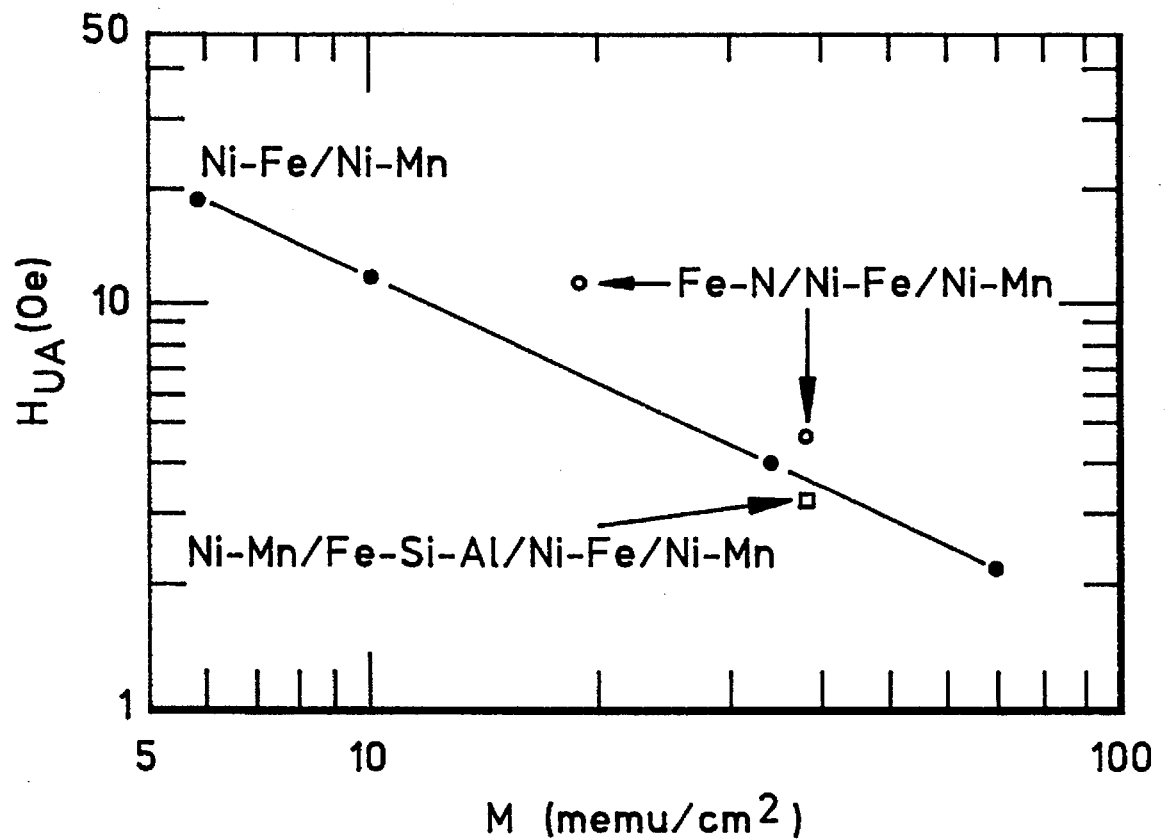
FIG. 10 is a chart plotting the magnetic moment M of one or more soft magnetic layers exchange-coupled to an antiferromagnet layer of NiMn versus the unidirectional anisotropy field $H_{UA}$.

With reference to FIGS. 6A and 6B, a multilayer magnetic structure according to the present invention wherein a layer of soft magnetic material is stabilized by a magnetic field provided by exchange-coupling with an adjacent layer of antiferromagnetic material is provided for use as magnetic shielding elements or other magnetic elements within an MR head. FIG. 6A shows a magnetic structure 51 comprising a layer 53 of a soft magnetic material with a layer 55 of an antiferromagnetic material in physical contact with the soft magnetic layer. Fe alloys such as NiFe, FeSiAl, or FeN, for example, or other suitable ferromagnetic material may be used for the soft magnetic layer 53. NiMn, FeMn or NiO or other suitable antiferromagnetic materials may be used for the antiferromagnetic layer 55. In a preferred embodiment, a 30 nanometer (nm) thick NiMn film 55 is formed by sputter deposition, for example, over a 440 nm thick layer of NiFe. As illustrated in FIG. 10, the magnitude of the exchange-coupled field is a function of the antiferromagnetic material used, the ferromagnetic material (i.e., the soft magnetic material) and the thickness of the soft magnetic layer 53. Thus the amount of shift of the BH loop (as shown in FIG. 5B) may be controlled to provide desired operating characteristics. For example, since the magnetization, $M_s$, for FeN is approximately double the $M_s$ for NiFe, the same magnitude exchange field may be obtained with NiMn and FeN as that obtained with NiMn and NiFe-having a NiFe layer twice as thick as the FeN layer thickness.

FIG. 6B shows a second embodiment of the magnetic structure according to the present invention wherein a thin buffer layer of a second soft magnetic material is inserted between the antiferromagnetic layer and the first soft magnetic layer for example, a preferred embodiment of the multi-layer structure 57 comprises a layer 59 of a first soft magnetic material, such as FeSiAl, a buffer layer of a second soft magnetic material, such as NiFe, and a layer 63 of an antiferromagnetic material such as NiMn. In this case, the magnitude of the exchange-coupled field is proportional to the sum of the thicknesses of the first soft magnetic layer 59 and the buffer layer 61.

By depositing a 30 nm thick NiMn film on top of a 440 nm thick NiFe film and annealing the bilayer films for 10 hours at 320° C., the easy-axis hysteresis loop can be shifted by an amount of 4.2 Oe, as shown in FIG. 5B. This shift, defined as a unidirectional anisotropy field ($H_{UA}$), results from exchange coupling between the NiFe and NiMn films. Coercivity is one half of the applied field H between the vertical lines of the loop 66 intersecting the abscissa. Since the hysteresis loop 66 has been translated to the right by $H_{UA}$, the amount of applied field required to commence a domain wall motion is the sum of the $H_{UA}$ plus the coercivity $H_{CE}$. The exchange field $H_{UA}$ increases the uniaxial anisotropy to stabilize the uniform domain configuration, as shown in FIG. 4A. A certain degree of stability is desirable so that a uniform domain configuration is established and a return to this configuration is assured upon relaxation of an external applied field H. If the uniaxial anisotropy and/or exchange field is too large, however, the magnetic moments become too large and the shield material loses permeability. The hysteresis loop along the hard axis for the NiFe/NiMn is shown at 68 in FIG. 5B.

A good shield material requires high permeability. This means that the shield material has soft magnetic properties and will guide magnetic flux such as external applied fields H thus shielding the MR sensor. We have found that the most desirable magnetic properties for a shield layer of a read head are as follows: uniaxial anisotropy $H_{KU}$ greater than 5 Oe and less than 15 Oe; permeability $\mu$ greater than 1,000; coercivity along the easy axis $H_c$ less than 3 Oe; and exchange field $H_{UA}$ greater than 3 Oe and less than 10 Oe provided $H_{UA}$ is greater than $H_C$, and $H_{KU}$ plus $H_{UA}$ equals 5 to 15 Oe.

Assuming an external field H is applied perpendicular to the easy axis of a shield layer which has uniaxial anisotropy and exchange fields, the magnetic moment M of the shield material assuming an angle $\phi$ with respect to the easy axis due to the external field, the following equations will apply:

$$\text{Magnetic Energy } E = -K_U \cos^2\phi - K_{UA}\cos\phi - (M)(H)\sin\phi$$

| uniaxial | unidirectional | external |
| anisotrophy | anisotrophy | field energy |
| energy | energy | | minimizing this energy gives:

$$\frac{dE}{d\phi} = 0 = \frac{2K_U}{M}\sin\phi + \frac{K_{UA}}{M}\frac{\sin\phi}{\cos\phi} - H$$

$$H = H_{Ku}\sin\phi + H_{UA}\tan\phi = \left(H_{KU} + \frac{H_{UA}}{\cos\phi}\right)\sin\phi$$

For large external fields, angle $\phi$ becomes large and the material becomes more stable due to the term $H_{UA}/\cos\phi$. Accordingly, upon removal of the external field H, the magnetization is forced to return to a uniform state parallel to the easy axis.

For small $\phi$, $\sin\phi = \tan\phi$, then $H = (H_{KU} + H_{UA})\sin\phi$ where $H_{KU}$=uniaxial anisotropy field $H_{UA}$=unidirectional anisotropy field.

Figure 7A:
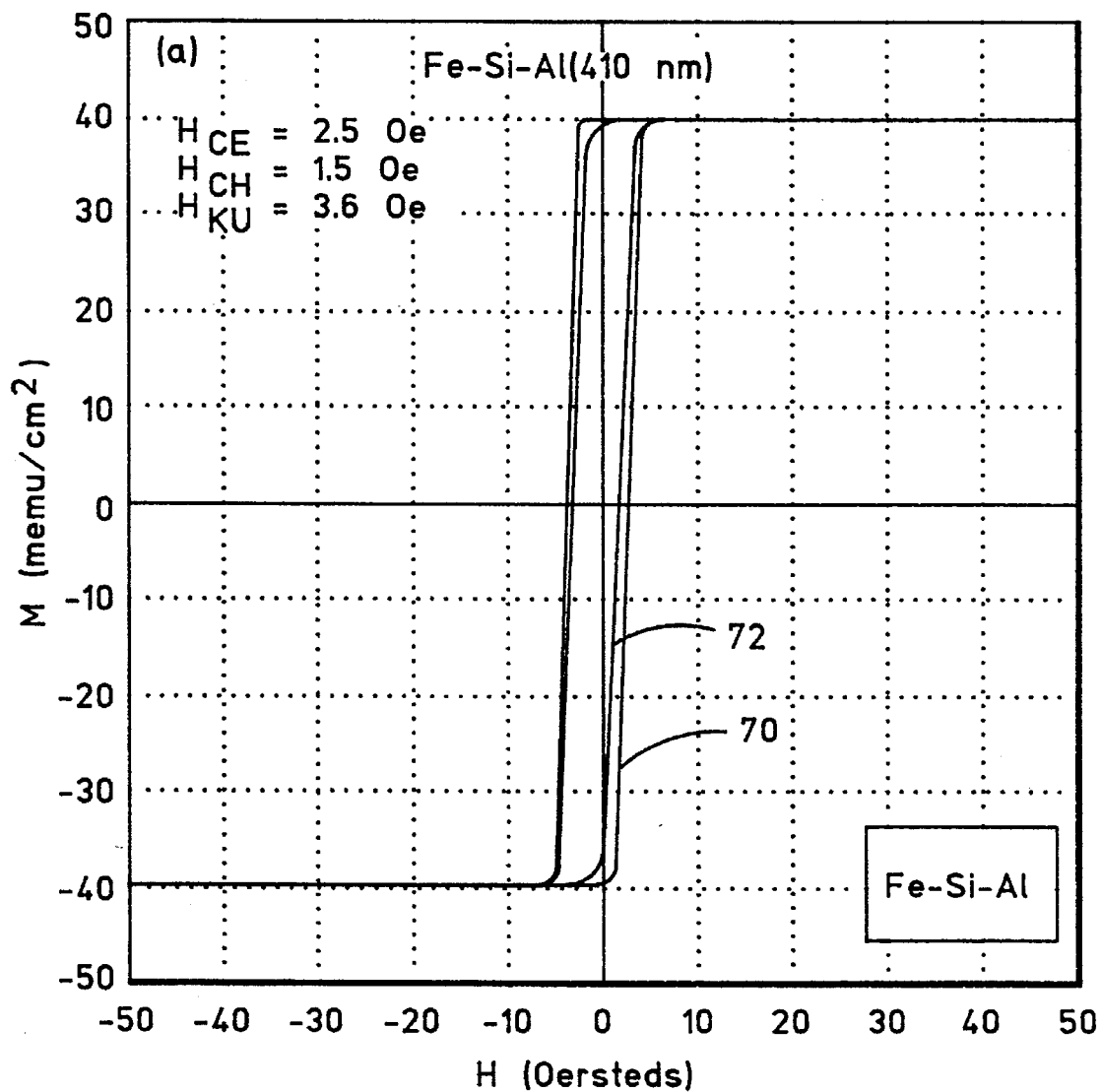
FIG. 7A is a cross-sectional view of a Sendust film and corresponding hysteresis loops along the easy axis and the hard axis.

Sendust (FeSiAl), which has $M_s = 1022$ emu/cm$^3$, is a typical shield material for read heads because of its soft magnetic properties, high hardness and high resistance to corrosion. A single Sendust layer is shown in FIG. 7A. Unfortunately, this Sendust layer after annealing for 2 hours at 500° C. has low uniaxial anisotropy $H_{KU}$ which makes it nearly isotropic. This can be seen from the graph shown in FIG. 7A. FIG. 7A shows hysteresis loops 70 and 72 along the easy axis and hard axis of the material. The uniaxial anisotropy $H_{KU}$ is 3.6 Oe. When this single layer of Sendust is subjected to an on and off external field H, the domain walls will change and come back to a different condition than that shown in FIG. 7A. Because of a change in the domain configuration between read operations of the read head, the MR sensor of the read head is subjected to different magnetostatic relationships with the first and second shields S1 and S2 of FIG. 2 causing a change in the bias point 44 shown in FIG. 3 and erroneous or nonlinear response of the read head.

Figure 7B:
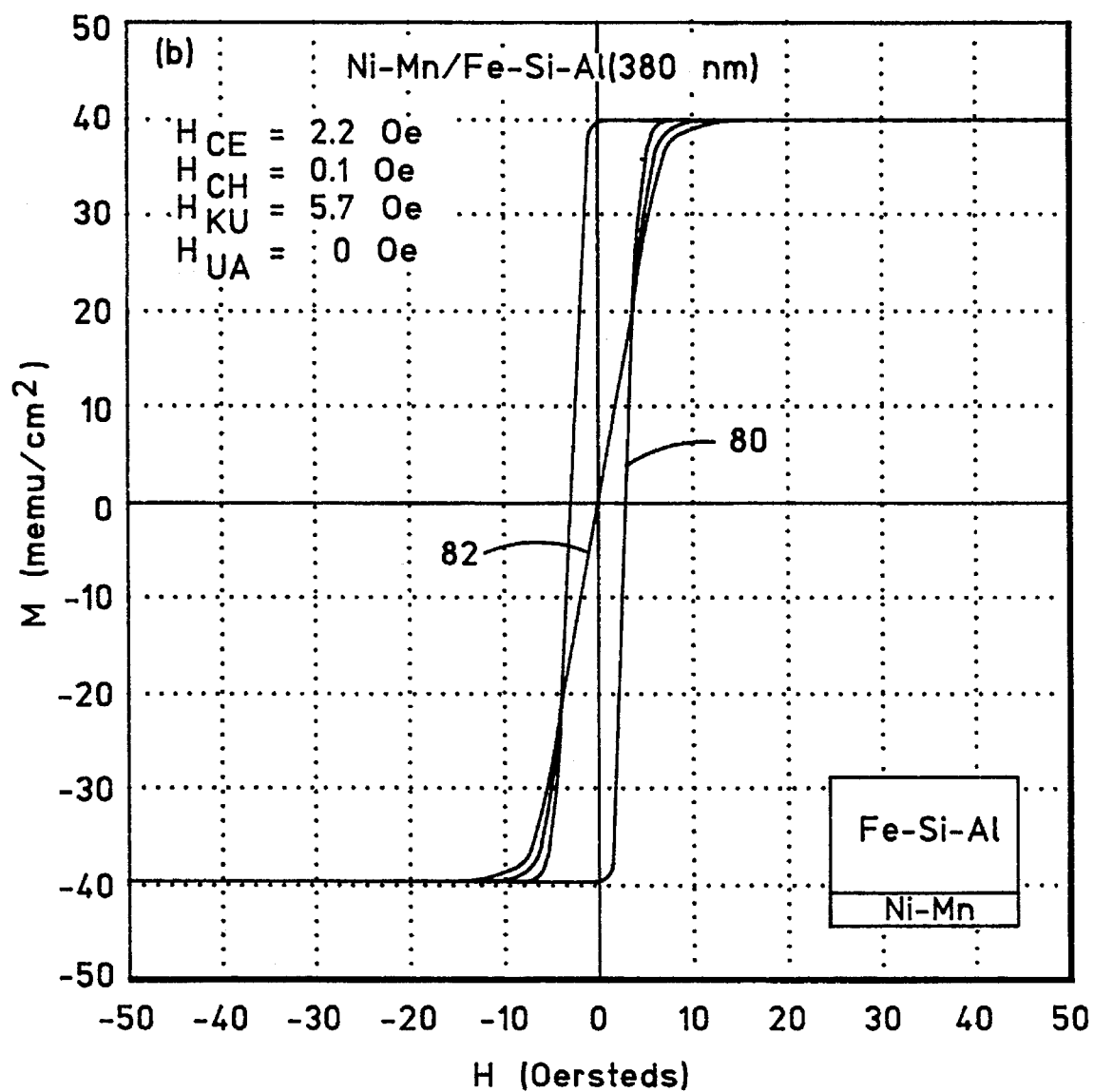
FIG. 7B is a cross-sectional view of NiMn/Sendust films and corresponding hysteresis loops along the easy axis and the hard axis.

We have found that by depositing a layer of Sendust on top of a layer of NiMn that the magnetic properties of the Sendust can be significantly improved to maintain a constant magnetostatic relationship between the shield layers and the MR sensor after excitation by an external magnetic field H. As shown in FIG. 7B, we have deposited 380 nm Sendust on top of a 30 nm thick NiMn film. The resulting hysteresis curves 80 and 82 along the easy axis and hard axis, respectively, of the lamination is shown in FIG. 7B. The resulting uniaxial anisotropy $H_{KU}$ has been increased to 5.7 Oe. This level exceeds the stress-induced anisotropy so as to maintain a uniform configuration of the domains within the material as shown in FIG. 4A. The coercivity $H_{CE}$ along the easy axis is 2.2 Oe. The uniaxial anisotropy is sufficient to return the domains within the material to a constant configuration after excitation by an external field.

Figure 8A:
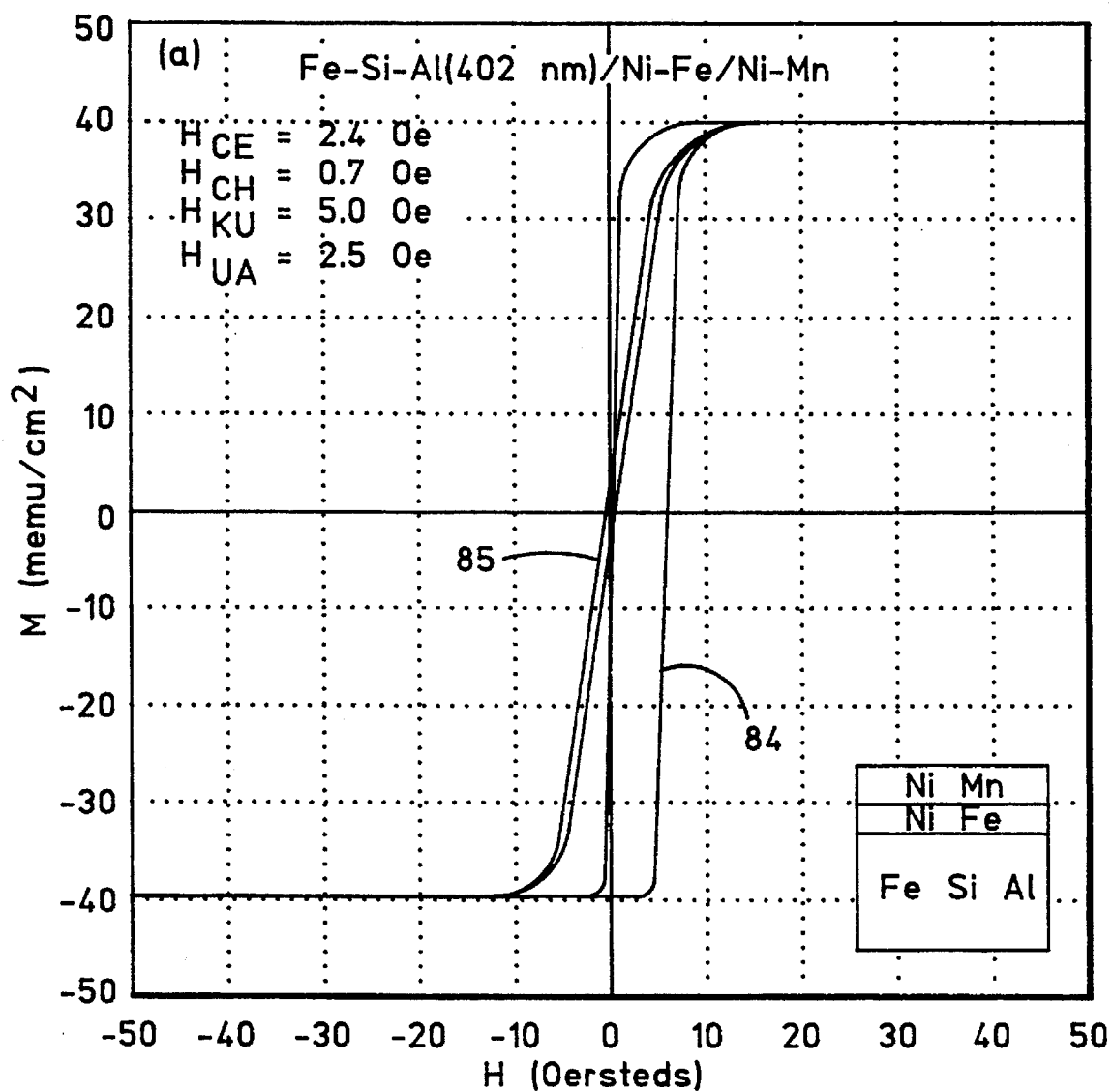
FIG. 8A is a lamination of Sendust, NiFe and NiMn films with their corresponding hysteresis loops along the easy axis and the hard axis.
Figure 8B:
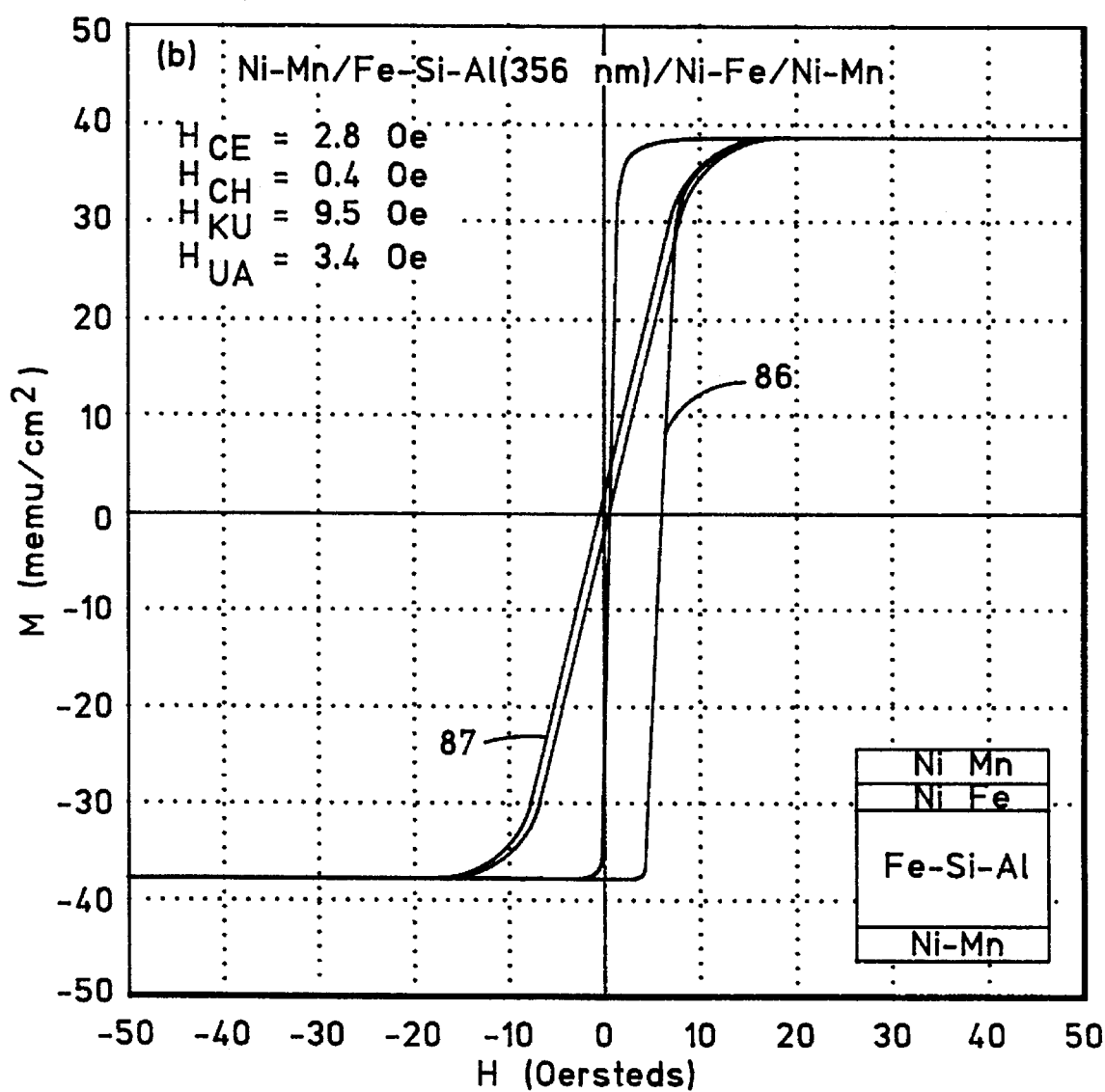
FIG. 8B is a lamination of NiMn, Sendust, NiFe, and NiMn with corresponding hysteresis loops along the easy axis and the hard axis.

In another embodiment we have modified the embodiment shown in FIG. 7B by providing a buffer layer of NiFe between the Sendust and NiMn as shown in FIG. 8A. This produced a surprising result by providing an exchange field of 2.5 Oe after annealing for 10 hours at 320° C. The exchange field is evident from the fact that the easy axis 84 has been translated to the right along the abscissa, the hysteresis loop along the hard axis being shown at 85. With this lamination the uniaxial anisotropy $H_{KU}$ was 5.0 Oe. FIG. 8B shows still a further embodiment over the FIG. 8A embodiment by sandwiching the Sendust layer between the buffer layer and another NiMn layer. Another surprising result was obtained by significant increases in the uniaxial anisotropy $H_{KU}$ and the exchange field anisotropy $H_{UA}$. In FIG. 8B the hysteresis loop along the easy axis is shown at 86 and the hysteresis for the hard axis is shown at 87. In comparing the graph in FIG. 8B with the graph in FIG. 8A, the uniaxial anisotropy $H_{KU}$ has been increased from 5.0 Oe to 9.5 Oe and the exchange field anisotropy has been increased from 2.5 Oe to 3.4 Oe. Both of the Sendust lamination embodiments shown in FIGS. 8A and 8B provide highly stable shield material which is assured of returning to a uniform domain state at the application of high external fields, such as from the write head of a merged MR head. Between the two embodiments, 8A and 8B, the embodiment shown in 8B is significantly enhanced over the 8A embodiment.

Figure 9A:
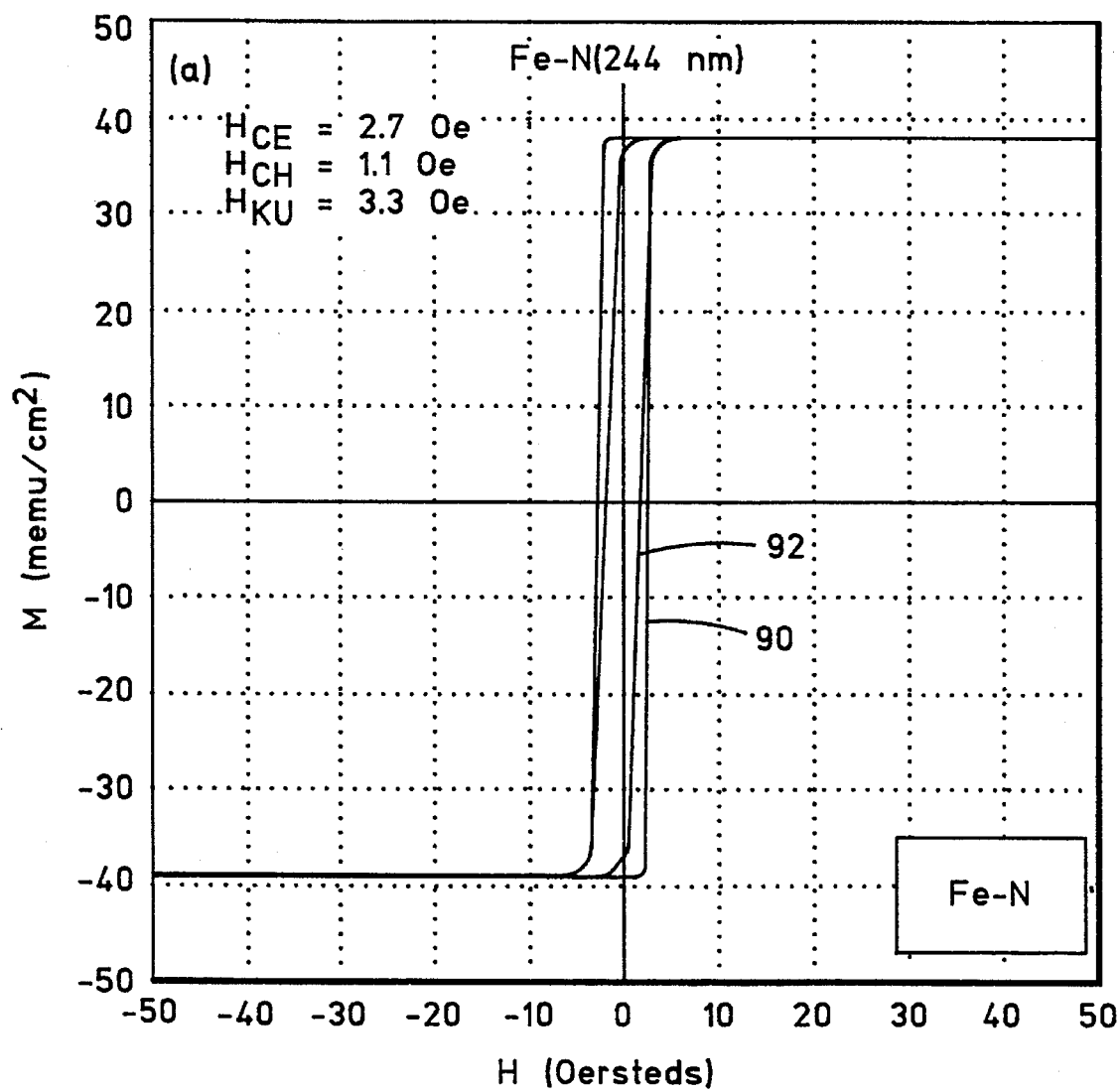
FIG. 9A shows a FeN film and its hysteresis loops along the easy axis and the hard axis.
Figure 9B:
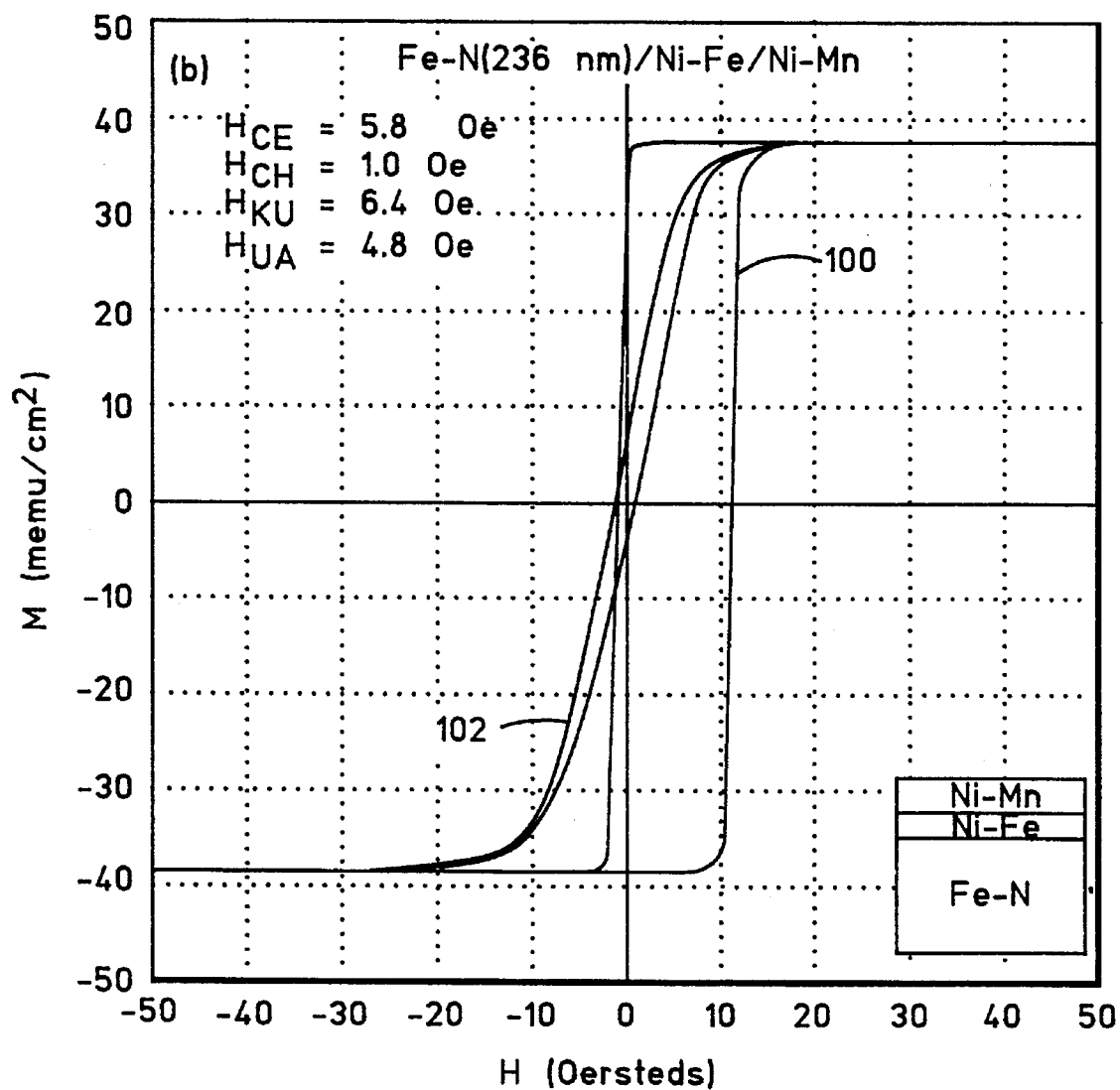
FIG. 9B shows laminated FeN and NiMn films which are separated by a buffer layer of NiFe with corresponding hysteresis loops along the easy axis and the hard axis.

Another material which exhibits soft magnetic and good mechanical properties for shields of an MR head is FeN (Ms=1552 emu/cm$^3$). A single layer of FeN with a thickness of 244 nm is illustrated in FIG. 9A. Hysteresis loops 90 and 92 along the easy and hard axis, respectively, of the FeN layer is also shown in FIG. 9A. The FeN layer exhibited uniaxial anisotropy $H_{KU}$ of 3.3 Oe and a coercivity $H_{CE}$ of 2.7 Oe. We have discovered that by laminating an FeN layer with a NiMn layer and annealing for 10 hours at 320° C., we can achieve an exchange coupling which will establish an exchange field. In FIG. 9B we have deposited NiFe (10 nm)/NiMn (30 nm) films on top of 236 nm FeN. The resulting hysteresis loops 100 and 102 along the easy axis and the hard axis, respectively, are also shown in FIG. 9B. After annealing for 10 hours at 320° C., the uniaxial anisotropy $H_{KU}$ was 6.4 Oe, the coercivity $H_{CE}$ was 5.8 Oe and the exchange field $H_{UA}$ was 4.8 Oe. It can be seen from FIG. 9B that the hysteresis loop 102 is symmetrical about the abscissa and the ordinate while the hysteresis loop 100 along the easy axis is translated to the right along the abscissa. As stated hereinabove, the exchange field increases the uniaxial anisotropy of the FeN layer which promotes return of the domains within the FeN to the same configuration after excitation by an external field H.

FIG. 10 is a chart illustrating magnetic moment of one or more soft magnetic layers versus $H_{UA}$. The filled circles are four examples of a lamination of NiFe and NiMn at various thicknesses of the NiFe. It can be seen that there is a linear relationship between the thickness of the NiFe and the exchange field $H_{UA}$ with the exchange field $H_{UA}$ increasing as the thickness of the NiFe layer decreases. Another example is shown by the open circle which is a lamination of FeN and NiMn with a buffer layer of NiFe therebetween. The thickness here is the combined soft magnetic layers of FeN and NiFe. It can be seen that the exchange field $H_{UA}$ is very close to the filled circle for the NiFe and NiMn lamination. The same holds true for the open square which is a lamination of NiMn, Sendust, NiFe, and NiMn. This chart shows that the controlling factor for tailoring the exchange field $H_{UA}$ is the use of buffer layer of NiFe and thickness of shield material.

Figure 12A:
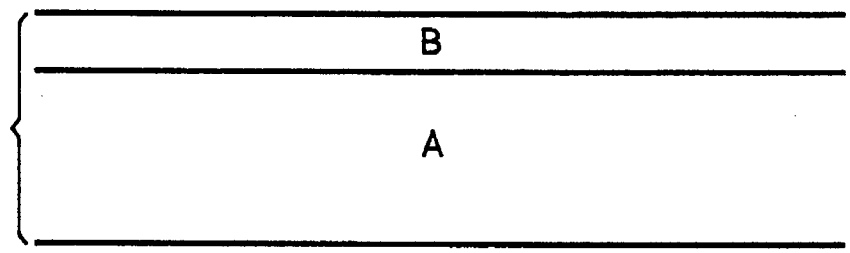
FIGS. 12A, 12B and 12C show various combinations of laminated shield layers.
Figure 12B:
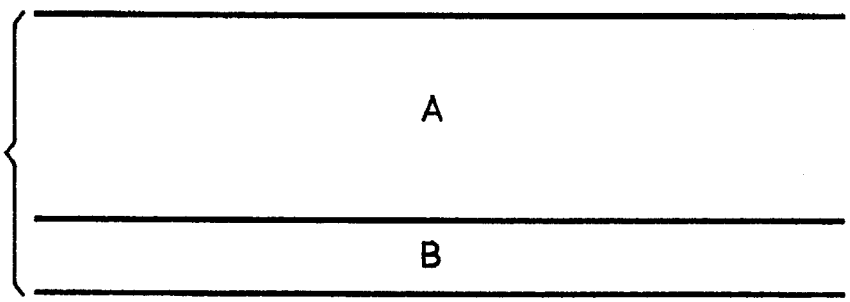
Figure 12C:
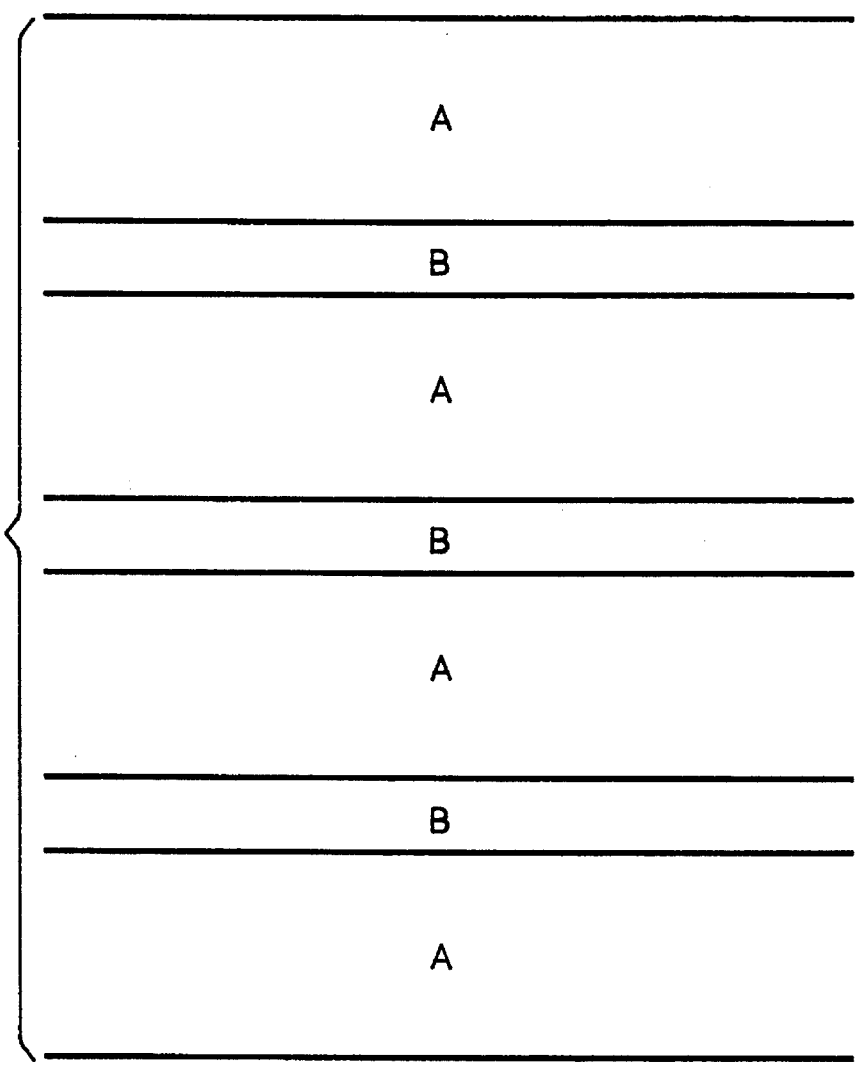

FIG. 11 is a schematic illustration of various combinations of layers coded A and B to be employed for various embodiments illustrated in FIGS. 12A, 12B and 12C. The only difference between the FIG. 12A and FIG. 12B embodiments is that in FIG. 12A the NiMn layer is deposited on the Fe-based layer and in FIG. 12B the Fe-based layer is deposited on the NiMn layer. In the FIG. 12C embodiment, the Fe-based layer is sandwiched between NiMn layers. The advantage of this embodiment is that we can control the Fe-based layer thickness for desired $H_{UA}$ field.

It has been found that $Ni_{81}Fe_{19}$ buffer layers with a thickness in the range 20–200 Å work for purposes of the present invention. Each of the Fe-based layers can be in the range 0.05–1 µm, with total thickness of the soft material about 1 µm, the Fe-based layers being FeSiAl (Sendust), FeN and NiFe.

It should be understood that because of the unique properties of the aforementioned laminations that they can be used for other applications, such as write poles for an inductive head. With these materials the write poles will be assured of returning to a stable domain structure after each write operation.

Although the invention has been described in terms of the specific embodiments, the inventors contemplate modifications and substitution to various components of the invention which would occur to a person of ordinary skill in the art, and therefore, would be in the scope of the invention, which is to be limited only by the claims which follow.

We claim:

1. A combined magnetic head which includes an MR read head adjacent an inductive write head comprising:
    the inductive write head including:
        a coil layer sandwiched between insulation layers, the insulation layers being sandwiched between first and second pole piece layers; and
        the first and second pole piece layers terminating in first and second pole tips respectively at a head surface;
    the MR read head including:
        an MR sensor sandwiched between first and second gap layers;
        first and second shield layers;
    the first and second gap layers being sandwiched between the first and second shield layers;
        the MR sensor, the first and second gap layers and the first and second shield layers terminating at said head surface;
    the first and second shield layers being subjected to consecutive write fields from the write head; and
    at least one of the first and second shield layers being constructed of a lamination of at least one antiferromagnetic layer and at least one soft magnetic layer wherein the soft magnetic layer has an easy axis parallel to the head surface and a hard axis perpendicular to the head surface, the antiferromagnetic layer increasing magnetic domain stability of the soft magnetic layer by increasing uniaxial anisotropy of the lamination,
    whereby after the occurrence of each of a number of said consecutive write fields, the said at least one of the first and second shield layers returns to a substantially common magnetic domain state so that linear response of the MR sensor remains substantially unchanged after each consecutive write field.

2. A combined head as claimed in claim 1 wherein said antiferromagnetic layer is comprised of NiMn.

3. A combined head as claimed in claim 2 including:
    the lamination having an exchange-coupled field wherein the magnitude of the exchange-coupled field is greater than the coercivity $H_C$ along an easy axis of the shield layer.

4. A combined head as claimed in claim 2 including:
    the lamination having a uniaxial anisotropy from 5 to 15 Oe, permeability greater than 1,000, coercivity $H_C$ along an easy axis less than 3 Oe and an exchange-coupled field between 3 Oe and 10 Oe.

5. A combined head as claimed in claim 2 including:

the soft magnetic shield layer being in direct contact with the antiferromagnetic layer.

6. A combined head as claimed in claim 2 including:

the lamination further including a buffer layer sandwiched between the antiferromagnetic layer and the soft magnetic layer.

7. A combined head as claimed in claim 6 including:

the buffer layer being NiFe with a thickness of 20 Å to 200 Å.

8. A combined head as claimed in claim 2 wherein said soft magnetic layer comprises an Fe alloy.

9. A combined head as claimed in claim 8 including:

the lamination further including a NiFe buffer layer being sandwiched between the NiMn layer and the Fe alloy layer.

10. A combined head as claimed in claim 9 wherein said Fe alloy comprises FeN.

11. A combined head as claimed in claim 10 including:

the FeN being 0.1–1.0 μm thick; and the buffer layer having a thickness of 20 Å to 200 Å.

12. A combined head as claimed in claim 11 including:

the lamination includes a plurality of NiMn layers, a plurality of NiFe buffer layers and a plurality of FeN layers laminated one after the other in a sequential relationship.

13. A combined head as claimed in claim 8 including:

the Fe alloy layer comprises FeSiAl.

14. A combined head as claimed in claim 13 including:

the lamination further including a NiFe buffer layer sandwiched between the NiMn layer and the FeSiAl layer.

15. A combined head as claimed in claim 14 including:

the NiFe buffer layer having a thickness of 20 Å to 200 Å;

another NiMn layer so that there are first and second NiMn layers; and the FeSiAl layer being sandwiched between the first NiMn layer and the NiFe buffer layer and the NiFe buffer layer being sandwiched between the FeSiAl layer and the second NiMn layer.

16. A combined head as claimed in claim 8 including: the Fe alloy layer being NiFe.

17. A combined head as claimed in claim 2 wherein said soft magnetic layer is selected from the group consisting of NiFe, FeN and FeSiAl.

18. A combined magnetic head as claimed in claim 2 including:

means for moving magnetic media;

means trier supporting the magnetic head adjacent the moving magnetic media; and means connected to the magnetic head for processing signals from the magnetic head.

19. A combined magnetic head as claimed in claim 2 wherein said first pole layer and said first shield layer are a common layer.

20. A combined magnetic head as claimed in claim 2 wherein said first pole layer and said first shield layer are separate layers.

21. A combined magnetic head as claimed in claim 1 including:

first and second shield layers, at least one of the shield layers being a lamination;

said lamination comprising Set A and Set B;

Set A comprising one of a NiMn layer and a lamination of NiMn and a buffer layer of NiFe; and Set B comprising one of a Fe based layer and a lamination of an Fe based layer and a buffer layer of NiFe.

22. A drive including the combined magnetic head of claim 21, the drive including:

means for moving magnetic media;

means for supporting the magnetic head adjacent the moving magnetic media; and means connected to the magnetic head for processing signals from the magnetic head.

23. A combined head as claimed in claim 21 including:

the lamination having a uniaxial anisotropy from 5 to 15 Oe, permeability greater than 1000, coercivity $H_C$ along an easy axis less than 3 Oe and an exchange field between 3 Oe and 10 Oe.

24. A combined head as claimed in claim 21 including:

each buffer layer being NiFe with a thickness of 20 Å to 200 Å.

25. A combined head as claimed in claim 21 including:

a first Set A and a second Set A; and

Set B being sandwiched between said first Set A and said second Set A.

26. A combined head as claimed in claim 25 including:

the buffer layer being NiFe with a thickness of 20 Å to 200 Å; and the Fe-based layer being 0.1–1 μm thick.

27. A combined head as claimed in claim 26 including:

a plurality of laminations as claimed in claim 24.

28. A combined head including the lamination as claimed in claim 27, the combined head including:

each of the first and second shield layers comprising said lamination.

29. A combined head as claimed in claim 28 including:

the first shield layer being common with a first pole piece of a write head.

30. A combined magnetic head as claimed in claim 21 wherein said first pole layer and said first shield layer are a common layer.

31. A combined magnetic head as claimed in claim 21 wherein said first pole layer and said first shield layer are separate layers.

* * * * *

UNITED STATES PATENT AND TRADEMARK OFFICE
CERTIFICATE OF CORRECTION

PATENT NO. : 5,515,221
DATED : May 7, 1996
INVENTOR(S) : Gill et al.

It is certified that error appears in the above-indentified patent and that said Letters Patent is hereby corrected as shown below:

Column 2, lines 33 and 37, change "(FEN)" to --(FeN)--.

Column 11, line 50, change "trier" to --for--.

Signed and Sealed this

Twelfth Day of August, 1997

Attest:

BRUCE LEHMAN

Attesting Officer

Commissioner of Patents and Trademarks